No. 723,837. PATENTED MAR. 31, 1903.
O. B. CRAFT.
SAW HANDLE.
APPLICATION FILED OCT. 22, 1902.
NO MODEL.
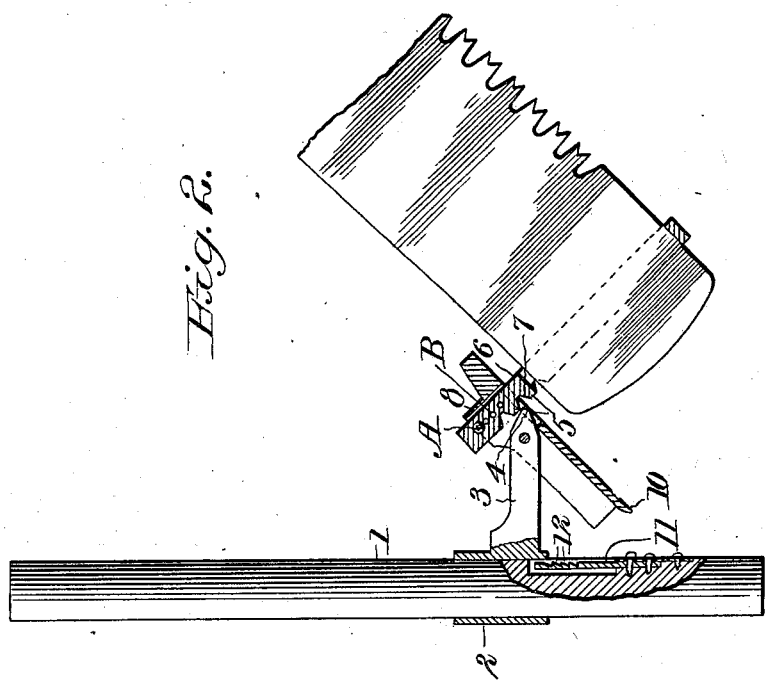
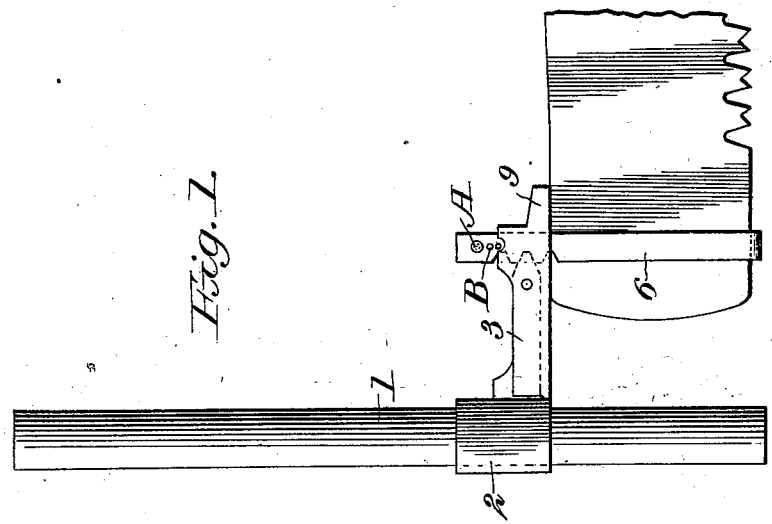
Witnesses
Inventor
Owen B Craft
By
Frank S Appleman
Attorney

UNITED STATES PATENT OFFICE.

OWEN B. CRAFT, OF STRATTONVILLE, PENNSYLVANIA.

SAW-HANDLE.

SPECIFICATION forming part of Letters Patent No. 723,837, dated March 31, 1903.

Application filed October 22, 1902. Serial No. 128,313. (No model.)

*To all whom it may concern:*

Be it known that I, OWEN B. CRAFT, a citizen of the United States of America, residing at Strattonville, in the county of Clarion and State of Pennsylvania, have invented certain new and useful Improvements in Saw-Handles, of which the following is a specification.

This invention relates to saw-handle attachments, and more particularly to handle attachments for crosscut-saws.

The object of the invention is to produce an attachment whereby the saw is clamped and held against displacement.

Furthermore, the object is to provide means whereby the blade may be applied and released by a simple operation, said means being simple in construction, efficient and satisfactory in use, and comparatively inexpensive to produce and maintain.

With the foregoing and other objects in view the invention consists in the details of construction and in the arrangement and combination of parts to be hereinafter more fully set forth and claimed.

In describing the invention in detail reference will be had to the accompanying drawings, forming part of the specification, wherein like characters denote corresponding parts in both views, and in which—

Figure 1 is a view in elevation of a saw with the invention applied. Fig. 2 is a detail view of the handle in position to release the blade.

In the drawings, 1 indicates a handle having a collar 2, which holds the arm 3 stationary. The outer end of the arm has a dog 4, which is designed to engage the teeth 5 of the bar 6, the said bar 6 having a slot 7 to receive the saw-blade. The bar is slidable in the slot 8 of the housing 9, said housing being pivoted near the outer end of the arm 3, with the bar in such relation to the dog of the arm as to cause the dog to engage the bar when the housing is parallel with the arm and to disengage the bar when the housing is swung at an angle to the arm. The bar is also moved longitudinally by the engagement of the dog as the housing is moved on its pivot. This movement serves to clamp the saw-blades when the parts are brought to the position shown in Fig. 1. The inner end of the housing has a lug 10, which engages the rack 11, said rack comprising a toothed spring which has one end attached to the handle and the other end movable in the slot 12 of the handle, the said rack being in such relation to the lug 10 as to automatically engage and retain it when the housing is parallel with the arm.

When the parts are in position shown in Fig. 1, the saw is clamped and held; but by pressing on the spring the lug is released, the housing is free to swing on its pivot, and the bar is forced down in the housing to release the blade.

The bar 6 is adjusted to take up wear or to accommodate saws of varying width by means of the pin A, which is placed in the holes B when the proper adjustment is made and before the parts are swung into the position shown in Fig. 1.

The construction, operation, and advantages will, it is thought, be understood from the foregoing description, it being noted that various changes may be made in the proportions and details of construction without departing from the scope of the invention.

Having fully described my invention, what I claim as new, and desire to secure by Letters Patent, is—

1. In a device of the character described, a handle, an arm carried thereby, a member pivoted to the arm, a blade-carrying member slidable in the pivoted member, means on the arm for engaging the blade-carrying member and means for engaging and retaining the pivoted member in certain relation to the arm.

2. In a device of the character described, a handle, an arm carried thereby, a member pivoted to the arm, a blade-carrying member slidable in the pivoted member, means on the arm for engaging the blade-carrying member, a rack carried by the handle and means on the pivoted member for engaging the rack.

3. In a device of the character described, a handle, a rack carried thereby, an arm projecting from the handle and having a dog on its outer end, a housing pivoted to the arm and having a lug on its inner end to engage the rack, a bar slidable in the housing and having teeth engaged by the dog of the arm and means for permitting the adjustment of the bar in the housing.

In testimony whereof I affix my signature, in the presence of two witnesses, this 17th day of October, 1902.

OWEN B. CRAFT.

Witnesses:
W. DAY WILSON,
J. A. F. HOY.